United States Patent [19]

Baker et al.

[11] Patent Number: 5,716,584
[45] Date of Patent: Feb. 10, 1998

[54] DEVICE FOR THE SYNTHESIS OF COMPOUNDS IN AN ARRAY

[75] Inventors: William R. Baker, Bellevue; J. Andrew Towell, Seattle, both of Wash.; James R. Harness, Lake Zurich, Ill.

[73] Assignee: PathoGenesis Corporation, Seattle, Wash.

[21] Appl. No.: 691,952

[22] Filed: Aug. 5, 1996

Related U.S. Application Data

[63] Continuation of Ser. No. 524,943, Sep. 7, 1995, abandoned.
[51] Int. Cl.⁶ .................................................. C08F 2/00
[52] U.S. Cl. ...................... 422/131; 422/297; 435/303.1
[58] Field of Search .......................... 422/81, 99, 102, 422/131, 297; 435/303.1, 305.1, 305.2, 305.3

[56] References Cited

U.S. PATENT DOCUMENTS

| | | | |
|---|---|---|---|
| 4,493,815 | 1/1985 | Fernwood et al. | 422/101 |
| 4,526,690 | 7/1985 | Kiovsky et al. | 210/235 |
| 4,625,096 | 11/1986 | Fletcher | 219/331 |
| 5,053,454 | 10/1991 | Judd | 525/54.11 |
| 5,219,528 | 6/1993 | Clark | 422/101 |
| 5,324,483 | 6/1994 | Cody et al. | 422/131 |
| 5,354,663 | 10/1994 | Charm et al. | 435/303.1 X |
| 5,472,672 | 12/1995 | Brennan | 422/131 |

OTHER PUBLICATIONS

SyRo II O.S. Multiple Synthesis Robot—brochure.

*Primary Examiner*—Christopher Kim
*Attorney, Agent, or Firm*—Graybeal Jackson Haley LLP

[57] ABSTRACT

A method and device for the simultaneous production of chemical compounds in an array which is capable of providing a very broad range of reaction environments including reaction temperatures of −40° C. to 150° C., reflux condensation, and a selective gas environment. The invention also allows the addition of several reagents during the course of the production process. The device is comprised of a number of different block sections which are fastened together to provide the required reaction environment.

11 Claims, 8 Drawing Sheets

DEVICE FOR THE SYNTHESIS OF COMPOUNDS IN AN ARRAY

CROSS REFERENCE TO RELATED APPLICATIONS

This is a continuation of U.S. patent application Ser. No. 08/524,943, filed Sep. 7, 1995, abandoned, the benefit of the filing date of which are hereby claimed under 35 USC §120.

FIELD OF THE INVENTION

The present invention relates to a device and method for the production of chemical compounds. More specifically the device and method relate to the simultaneous production of chemical compounds in an array.

BACKGROUND OF THE INVENTION

Numerous methods and apparatus are well known in the prior art for the multiple simultaneous synthesis of peptides and oligonucleotides. However, all of these methods and devices are limited in one way or another in the range of reaction environments they can provide for or the types of reagents they can accommodate in carrying out a chemical process. Some systems can handle large arrays of reactions and a wide variety of reagents, but only for chemical reactions to be carried out at room temperature. Other systems can either heat or cool an ongoing reaction, but are unable to provide a reflux condenser to return a portion of the product stream to the chemical process. And still others are unable to provide an oxygen free environment within which to carry out the reaction.

One such known methodology is a solid state technique for the synthesis of peptides and oligonucleotides developed by Affymax Technologies N.V. and disclosed in U.S. Pat. No. 5,143,854. The Affymax technique involves sequentially using light to illuminate a plurality of polymer sequences on a substrate and delivering reaction fluids to the substrate. While undeniably useful, this system is limited to a small number of reactions and produces only trace amounts of product.

Another method and device for the synthesis of organic compounds is disclosed in Cody et al., U.S. Pat. No. 5,324,483 (Jun. 28, 1994), Apparatus for Multiple Simultaneous Synthesis. The Cody device consists of a reservoir block having a plurality of wells; a plurality of reaction tubes, usually gas dispersion tubes, having filters on their lower end; a holder block, having a plurality of apertures; and a manifold which may have ports to accommodate the maintenance/introduction of a controlled environment. The top wall has apertures and a detachable plate with identical apertures. While an advancement over the prior art, the Cody apparatus does not easily facilitate the heating, cooling, and reflux of the product as does the present invention.

SUMMARY OF THE INVENTION

The present invention concerns a method and device for the simultaneous synthesis of organic compounds in an array. It provides a very broad range of reaction environments including, but not limited to reaction temperatures of −40° C. to 150° C., reflux condensation, a selective gas environment, and addition of several reagents during the course of reaction. The present invention is uniquely suited to auxiliary processes including rotational shaking, magnetic stirring, sonicating, photo chemistry, and robotic automation.

The device of the present invention is most generally referred to as an array synthesis block and is made up of a number of smaller subunits in combination. The various subunits are assembled in a stack depending upon the type of reaction environment required by the desired synthesis. The device includes a retaining block section for holding reaction vessels. The preferred form of the retaining block section also incorporates gas flow channeling for providing a selective gas atmosphere. Usually nitrogen, argon, or some other inert gas is used in order to carry out reactions to the exclusion of oxygen. A temperature control block section is combined with the retaining block section in order to heat or cool the reaction vessels. Heating or cooling fluid is circulated through the temperature control block section. A reflux control block section required for certain synthesis is combined with the temperature control block section and the retaining block section in a stack in order to provide reflux condensation during reaction. Cooling gas or liquid is circulated through the reflux control block section. Alternatively, a portion of the of the reflux chamber is filled with a solid coolant such as ice or solid $CO_2$. These block sections are fastened together in a stack to form the array synthesis block. Fastening is accomplished by any number of suitable methods such as bolts passing through registering holes in the multiple block sections, clips holding the multiple block sections together, or an exterior bracket that clamps the block sections together as an assembled synthesis block. Once the individual sections of the synthesis block are fastened together the entire unit can be sonicated or fastened onto a rotational shaker.

BRIEF DESCRIPTION OF THE DRAWINGS

The invention, together with further advantages thereof, may best be understood by reference to the following description taken in conjunction with the accompanying drawings in which:

FIG. 3b is a partial cross-section view of the retaining plate illustrated in FIG. 3a.

FIG. 5b is a cross-section view of FIG. 5a.

DETAILED DESCRIPTION OF THE INVENTION

Figure 1A:
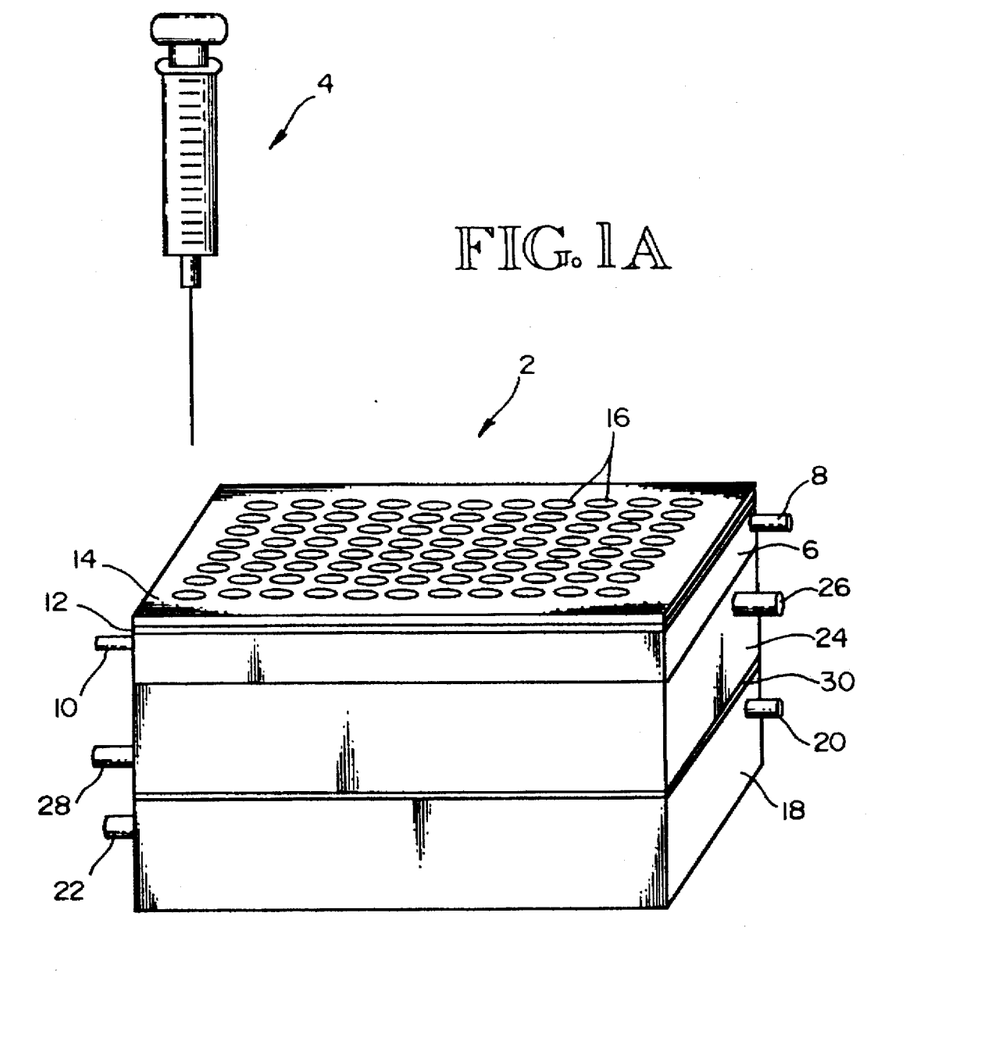
FIG. 1a is an isometric view of one embodiment of an array synthesis block utilizing a retaining block section, a reflux control block section, and a temperature control block section.

Shown in FIG. 1a is the basic multiple array synthesis block 2 and a needle equipped syringe 4. The basic components of the synthesis block 2 are: the retaining block section 6 having a retaining block section gas or liquid inlet 8 and in some embodiments a retaining block section gas or liquid outlet 10, a needle penetrable septum 12, a securing plate 14 having in one embodiment an array of apertures 16, a temperature control block section 18 having a fluid inlet 20 and a fluid outlet 22, a reflux control block section 24 having a condensing coolant inlet 26 and a condensing coolant outlet 28, and a spacer plate 30.

Figure 1B:
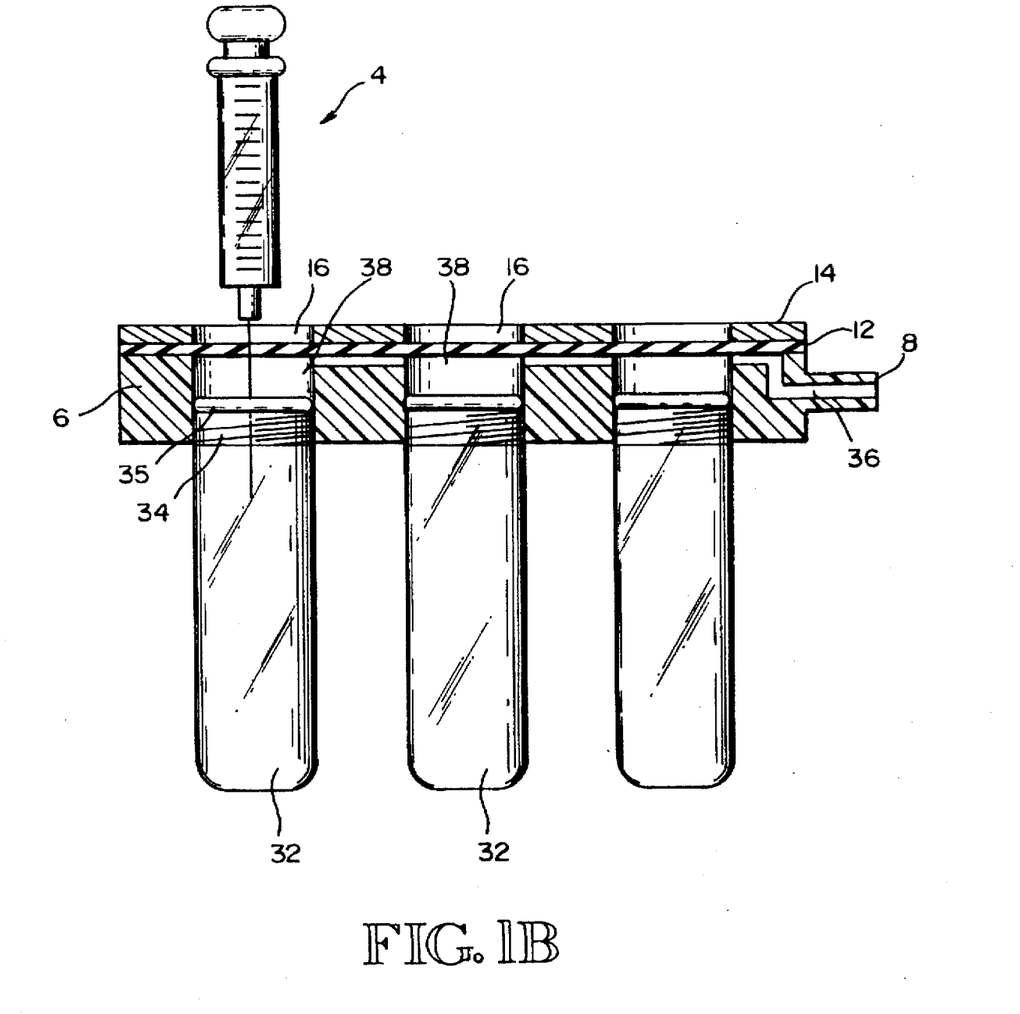
FIG. 1b is an enlarged partial cross-section view of a retaining block section illustrating the use of a needle to add reagents to the reaction vessels while maintaining a selective gas environment.

Referring to FIG. 1b, the retaining block section 6 has an array of apertures 38 passing through it. Along the top surface of this block 6 the apertures 38 are covered with a needle penetrable septum 12. This septum 12 is held in place by a securing plate 14 which has an array of securing plate apertures 16 passing through it and which are in registration with the apertures 38 in the retaining block section 6. The bottom portion of the apertures 38 in the retaining block section 6 are provided with a securing means 34 for fastening the open ends of the reaction vessels 32. Rubber O-rings 35 are placed in apertures 38 between the open ends of the reaction vessels 32 and the top portion of the apertures 38. Reaction vessels 32 are secured in place by mating threads on the lower interior surfaces of the threaded apertures 38 and the outside of top ends of the reaction vessels 32. The vessels 32 are then secured to the synthesis block 2 by screwing them into the lower portion of the apertures 38 in the retaining block section 6 to a depth in which the O-rings compress and form a tight seal between the top of aperture 38 and reaction vessel 32. Alternatively, a clip mechanism can be used to secure the reaction vessels 32 to the retaining block section 6.

The retaining block section 6 also has a series of gas flow channels 36 running through it which interconnect the apertures 38 above the point at which the reaction vessels 32 are secured. These gas flow channels 36 can be beneath the top surface of the retaining block section 6 or they may simply be routed out the top surface. If the channels 36 are routed out of the top surface as preferred, then septum 12 and securing plate 14 serve the dual purposes of enclosing the channels 36 and covering the tops of the apertures 38. The retaining block 6 section also has a gas inlet 8 which is generally connected to a source of gas in order to provide an inert gas environment to the individual vessels 32. Additionally, referring back to FIG 1a, a gas outlet 10 may be provided in the retaining block section 6. Depending upon the fastening means chosen to hold the multiple array synthesis block 2 together, the securing plate, the septum, and the retaining block section may be provided with a series of aligned fastener holes.

Figure 2:
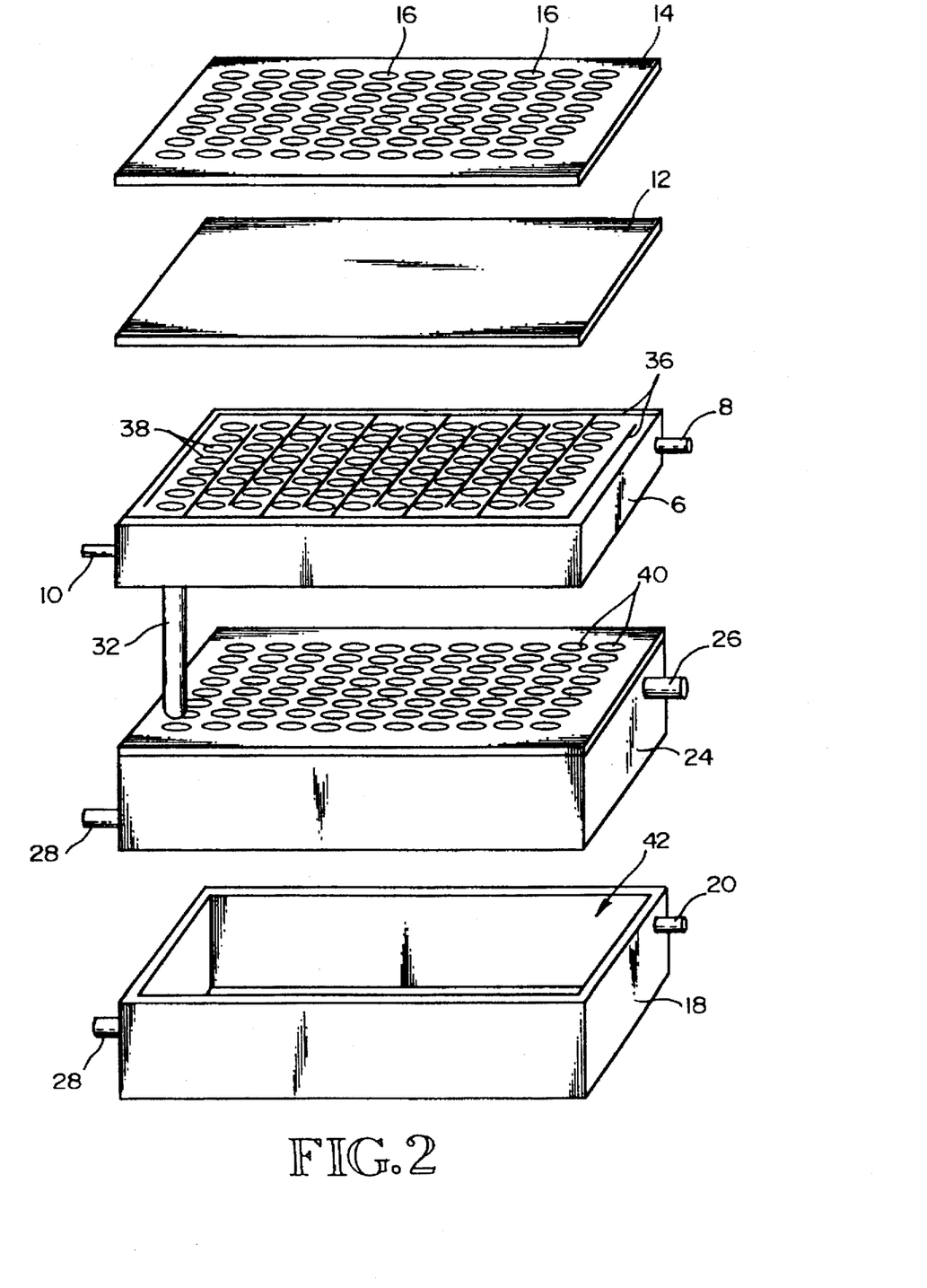
FIG. 2 is an exploded isometric view of FIG. 1a showing an attached reaction vessel.

FIG. 2 illustrates how the synthesis block 2 is assembled from the component block sections. The array of securing plate apertures 16, retaining block section apertures 38, and the reflux control block section apertures 40 are all in registration. The securing plate apertures 16 each need only be large enough to accommodate a needle. This figure also clearly illustrates how the septum 12 and securing plate 14 cover the open tops of channels 36 and the tops of the apertures 38 in the retaining block section 6. It can also be seen that the top of the temperature control block section 18 is open and that a fluid receiving cavity 42 is formed on the inside and that the closed bottom end of the reaction vessels 32 extend into the temperature control block section 18. One embodiment of the present invention includes a spacer/insulator plate 30 between the temperature control block section 18 and the reflux control block section 24 as illustrated in FIG. 1a.

Figure 3A:
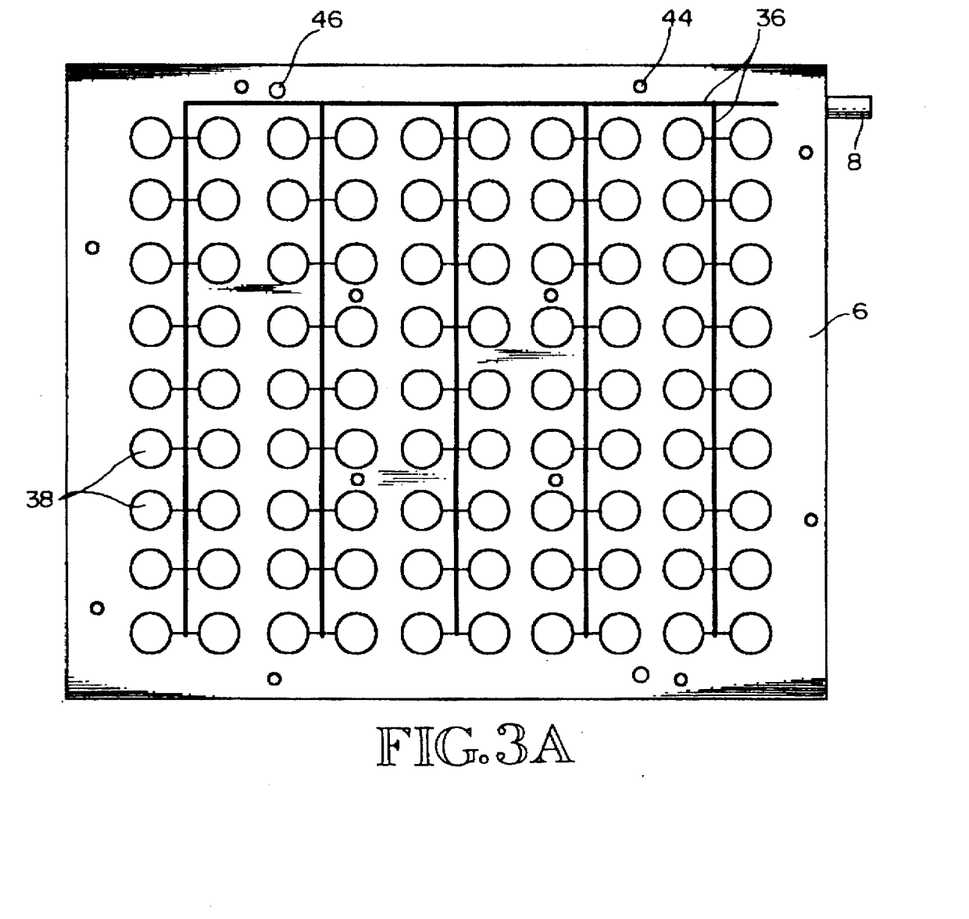
FIG. 3a is a top down view of a retaining block section.
Figure 3B:
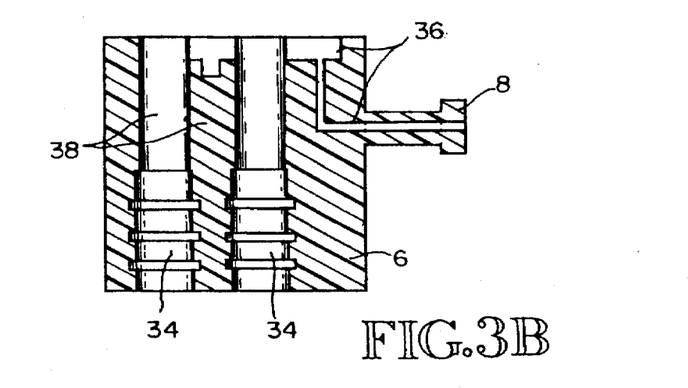

FIG. 3a shows how the channels 36 are laid out in the retaining block section 6 and illustrates one possible placement of bolt holes 44 and alignment post holes 46 used in assembling the synthesis block 2. FIG. 3b illustrates one embodiment of how the channels 36 can be connected to the retaining block gas inlet 8.

Figure 4A:
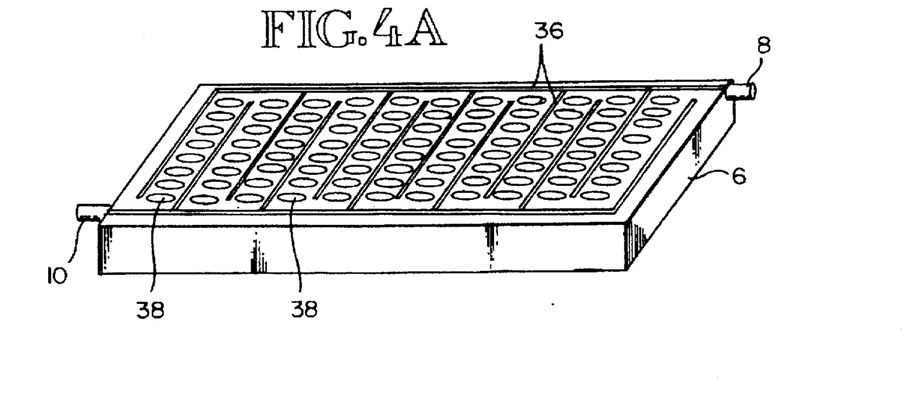
FIG. 4a is an isometric view of an alternative embodiment for a retaining block section.
Figure 4B:
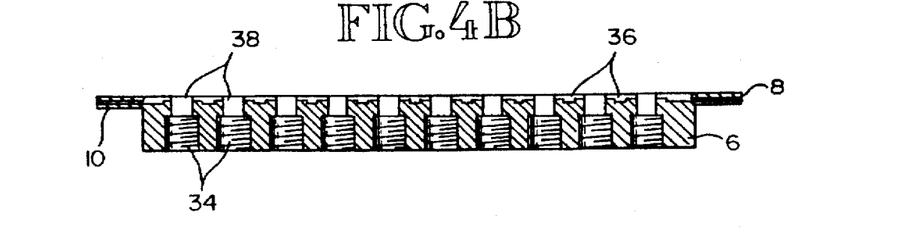
FIG. 4b is a partial cross-section view of an alternative embodiment for a retaining block section.
Figure 4C:
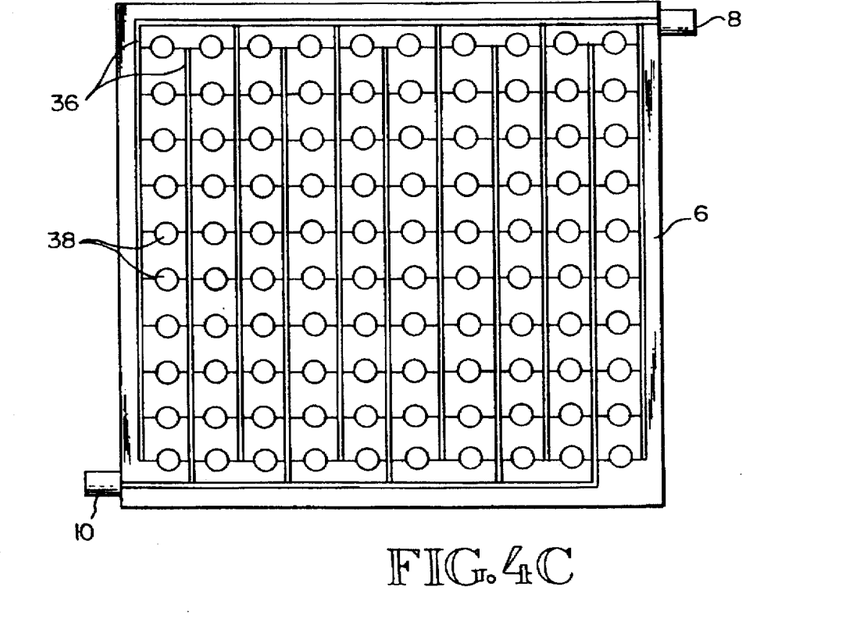
FIG. 4c is a top down view of an alternative embodiment of a retaining block section.

FIG. 4a shows an alternative layout for the channels 36 in retaining block section 6 and includes a retaining block gas outlet 10. FIG. 4b illustrates how the channels 36 along the top surface of retaining block section 6 interconnect the retaining block section apertures 38 above the securing means 34. FIG. 4c illustrates how the alternative network of channels 36 are connected to the retaining block gas inlet 8 and the retaining block gas outlet 10.

Figure 5A:
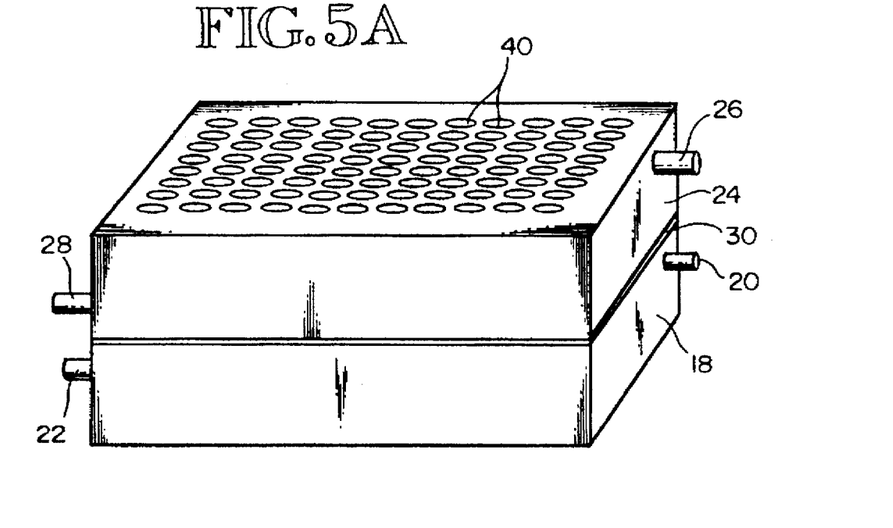
FIG. 5a is an isometric view of a reflux control block section, a spacer plate, and a temperature control block section of a multiple array synthesis block.
Figure 5B:
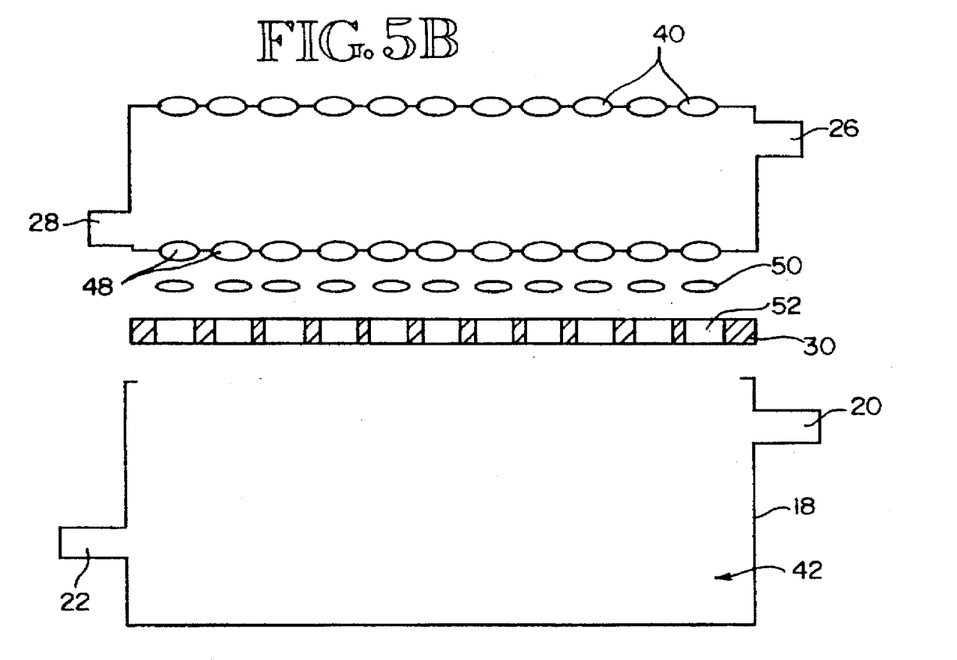

Referring to FIG. 5a the reflux control block section 24, the spacer/insulator plate 30, and the temperature control block section 18 are illustrated. FIG. 5b further illustrates that there is a second set of apertures 48 in the bottom of the reflux control block section 24 and that the spacer/insulator plate 30 also has a set of apertures 52 passing through it. A series of rubber O-rings 50 are used to form a seal between temperature control block section 18 and the reflux control block section 24. The bottom edges of apertures 48 and the upper edges of apertures 52 are bevelled to increase the efficacy of the O-rings 50.

Figure 6:
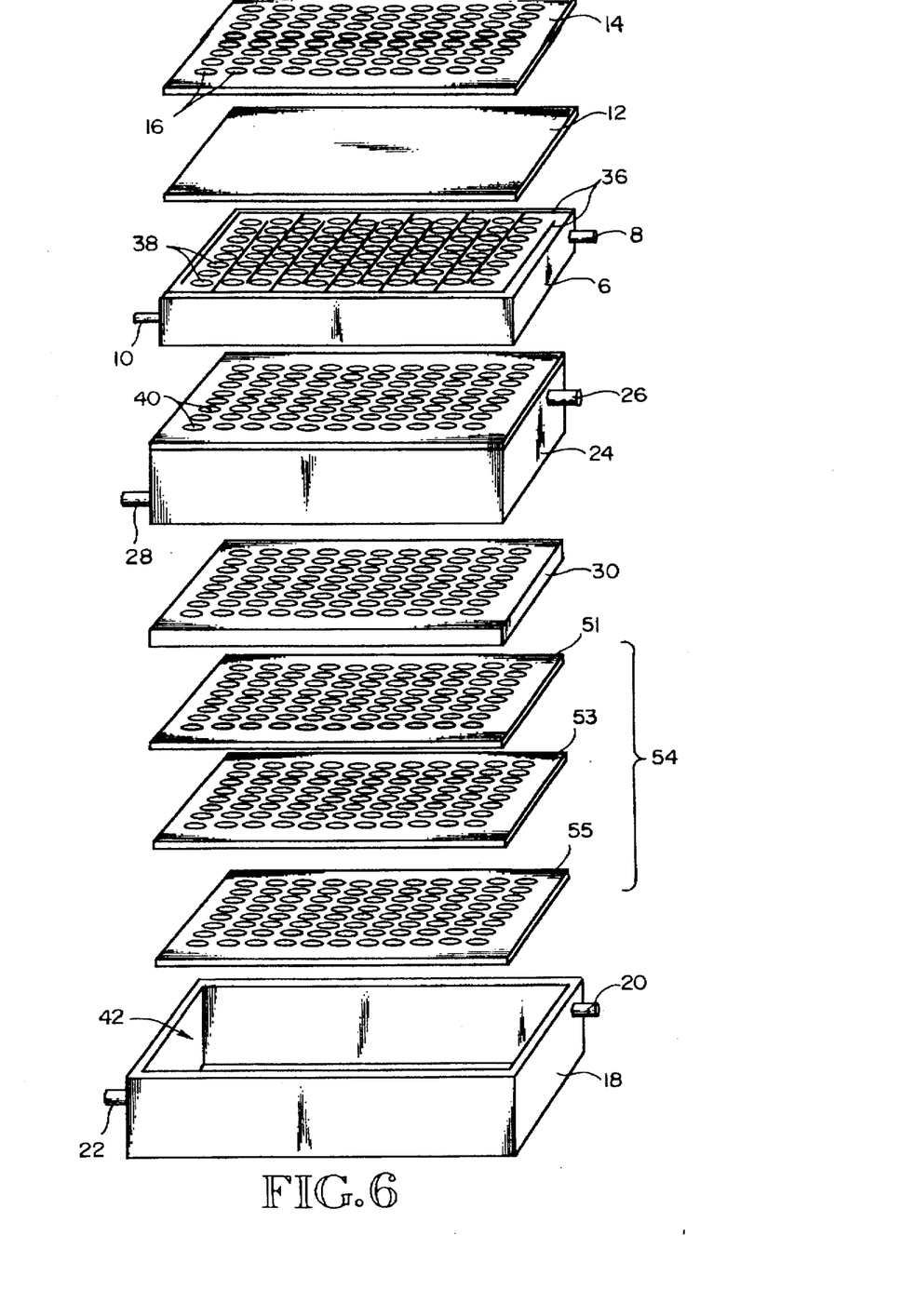
FIG. 6 is an exploded isometric view of an alternative embodiment of a multiple array synthesis block utilizing a splash guard and insulator mounted on top of the temperature control block section.

FIG. 6 shows an alternate embodiment including spacer/insulator plate 30 and splash guard 54. Splash guard 54 is comprised of three subunits: a splash guard top piece 51, a rubber splash guard gasket 53, and a splash guard base plate 55. All three subunits have an array of apertures in registration with each other and the apertures in spacer/insulator plate 30. The apertures in splash guard gasket 53 are slightly smaller in diameter than the apertures in the splash guard top piece 51 and the splash guard base plate 55 so as to provide a tight seal around reaction vessels.

Figure 7:
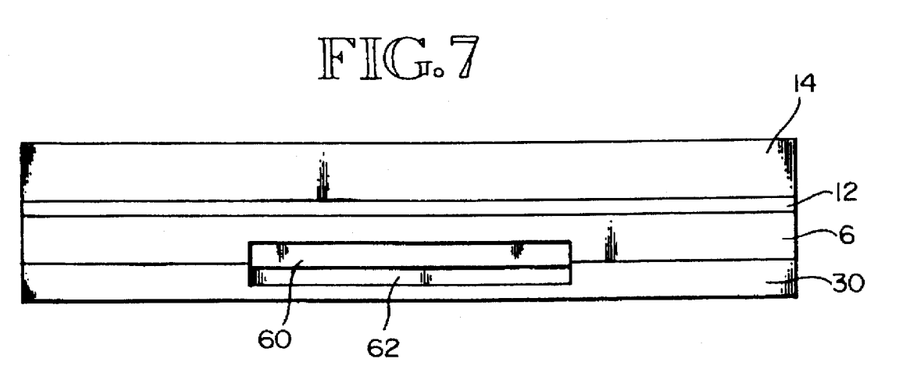
FIG. 7 is an illustration of a preferred form of the synthesis block incorporating grip recesses on the side of certain sections of the array synthesis block.

FIG. 7 illustrates an upper finger groove 60 provided along the side of retaining block section 6 and a lower finger groove 62 provided along the upper edge of spacer/insulator plate 30.

Construction and Materials

The basic components of the synthesis block 2 can be constructed out of any number of well known materials. The only restrictions are that they must be able to withstand the operating temperatures of the device and not react with the reagents and gasses to which the components will be exposed. The retaining block section 6 is preferably made out of Teflon™, but could alternatively be made from plastic, ceramic or other non-reactive material. In one embodiment the retaining block section 6 is a relatively flat panel having exterior dimensions of 12"×13"×½". The needle penetrable septum 12 is preferably made out of a sheet of silicon rubber, but another type of elastomeric polymer could easily be substituted. In one embodiment the needle penetrable septum 12 has the dimensions of 12"×13"×⅛". The securing plate 14 is preferably made out of aluminum, but could alternatively be made from plastic, ceramic, Teflon™, or another suitable metal. In one embodiment the securing plate 14 has the dimensions of 12"×13"×½". The temperature control block section 18 is preferably made out of aluminum, but could alternatively be made from another metal, plastic, or ceramic. In one embodiment the temperature control block section 18 has the dimensions of 12"×13"×2.5". The reflux control block section 24 is preferably made out of aluminum, but could alternatively be made from plastic, metal, ceramic, or glass. In one embodiment the reflux control block section 24 has the dimensions of 12"×13"×2.125". The spacer/insulator plate 30 is preferably made out of Teflon™, but could alternatively be made from plastic, ceramic, or metal. In one embodiment the spacer/insulator plate 30 has the dimensions of 12"×13"×¼". The splash guard 54 has dimensions roughly approximate to those of other components of the device and its top piece 51 and splash guard base plate 55 are preferably made of aluminum, but could alternatively be made from plastic, ceramic, or some other metal. The reaction vessels 32 are preferably made of glass, but other nonreactive materials could be used including plastic. The reaction vessels come in two sizes with the large vessels measuring approximately 16 mm in diameter and 125 mm in length and the small vessels measuring approximately 16 mm in diameter and 60 mm in length. The larger tubes are used primarily when reflux condensation is called for and the additional length is required to accommodated the reflux control block section 24 and provide additional volume for condensation to form.

Assembly of the Preferred Embodiment

The retaining block section 6, septum 12, and securing plate 14 are assembled as shown in FIG. 1b using 12 bolts, 8 bolts evenly spaced around the perimeter of Plate 14 and 4 bolts evenly around the center of plate 14. Rubber O-rings are place in each aperture 38 so as to rest against the top of the threaded section. Individual reaction vessels 32 with threaded tops are screwed into apertures 38. The entire reaction block assembly (retaining block section 6, septum 12, securing plate 14, and reaction vessels 32) is attached to the temperature control block section 18 either directly or in combination with the reflux control block section 24 as shown in FIG. 2. An inert gas hose is connected to the reaction block section 6 using gas inlet port 8. Cooling water inlet and outlet hoses (if applicable) are connected to the reflux block section 24 via condensing coolant inlet 26 and condensing coolant outlet 28. Heating and cooling hoses are attached to the temperature control block section 18 using fluid inlet 20 and fluid outlet 22. The assembled device is placed on an orbital shaker such as the Bellco orbital shaker (Vineland, N.J.) for stirring agitation. Inert gas, cooling water (if applicable), and heating or cooling fluid at the desired temperature is applied to the device. The device is now ready to receive solvents, chemical reagents and substrates.

Operation of the Preferred Embodiment

The individual reaction vessels 32 are purged with inert gas by inserting a hollow open ended needle through the septum 12 into each reaction vessel 12. Air is forced out of the vessel through the needle by the positive back pressure of the inert gas being pumped into gas inlet 8.

The next operational step involves the sequential introduction of solvents, chemical reagents, and substrates into the vessels 32 via syringe needle 4.

After the solvents, chemical reagents, and substrates are combined, the orbit shaker is turned on and an appropriate agitation level is selected to insure an even and controlled mixing of the reaction vessel contents. When the reactions are completed, the reaction vessels 32 brought to room temperature, water is added to the vessels and the desired reaction products are isolated by organic solvent extraction.

From the foregoing teachings, it can be appreciated by one skilled in the art that a new, novel, and nonobvious method and device for the simultaneous production of chemical compounds in an array has been disclosed. It is to be understood that numerous alternatives and equivalents will be apparent to those of ordinary skill in the art, given the teachings herein, such that the present invention is not to be limited by the foregoing description but only by the appended claims.

We claim:

1. A device for the retention of reaction vessels and the synthesis of compounds in an array comprising:

a) a retaining block section having a top surface and a bottom surface and a plurality of apertures communicating between the top surface and the bottom surface of the retaining block section; wherein said retaining block section is provided with a series of channels along the top surface of said retaining block section interconnecting the apertures in said retaining block section above the point at which the reaction vessel is secured; wherein said retaining block is provided with a gas inlet connected to said series of channels;

b) a fastener adapted for securing said reaction vessels within said retaining block section so that openings in said reaction vessels communicate with an associated aperture and closed vessel ends depend downward therefrom; and c) a solid needle penetrable septum for introducing reagents, covering and sealing said channels at the top surface of said retaining block so as to form individual conduits between said apertures in said gas inlet in said retention block section above the openings in said reaction vessels.

2. The device of claim 1, wherein said device additionally comprises:

d) a securing plate disposed above said solid septum and detachably fastening the septum to the top surface of said retention block section, said securing plate having at least one opening in registration with said apertures in the top surface of said retention block section for receiving a needle.

3. The device of claim 2, wherein said device additionally comprises:

e) a temperature control block section having an outer surface, an inner surface, an open top end, and a closed bottom end defining a fluid receiving cavity, said temperature control block section mounted below said retaining block section and receiving said reaction vessels through said open top end so that the downwardly depending closed vessel ends extend below the plane of the open top end and into the fluid receiving cavity.

4. The device of claim 3, wherein said temperature control block section is provided with a fluid inlet and a fluid outlet communicating from the exterior of said temperature control block section and said interior cavity.

5. The device of claim 4, wherein said device additionally comprises:

f) a reflux control block section detachably mounted between said retaining block section and said temperature control block section.

6. The device of claim 5, wherein said reflux control block section is a structure having a top surface and a bottom surface, the structure is formed to provide an interior cavity, and a plurality of apertures are provided to receive a midbody portion of said reaction vessels, between said open upper end and said closed lower end, through the top of said reflux control block section and to allow the bottom ends of said reaction vessels to extend through the bottom surface of said reflux control block section and into said temperature control block section.

7. A device for the retention of a reaction vessel having an open upper end and a closed lower end and the synthesis of compounds in an array comprising:

a) a retaining structure having outside surface defining an interior cavity having an interior surface;

b) a reaction vessel securing structure provided with an aperture in communication with said interior cavity and having a mounting structure for holding the open end of a reaction vessel in communication with said interior cavity and to allow the closed end of said reaction vessel to depend from said reaction vessel securing structure; wherein said retaining structure is provided with a series of channels along the top surface of said retaining structure interconnecting the aperture above the point at which the reaction vessel is secured; wherein said retaining structure is provided with a gas inlet connected to said series of channels;

c) a gas inlet port in communication with said interior cavity; and d) a chemical injection and withdrawal port in communication with said interior cavity and covered with a solid needle penetrable septum and oriented to accommodate the deposition and withdrawal of material from said reaction vessel.

8. The device of claim 7, wherein said device additionally comprises:

e) a second interior cavity having an interior surface defined within said retaining structure;

f) a second reaction vessel securing structure provided with a second aperture in communication with said second interior cavity and having a second mounting structure for holding the open end of a second reaction vessel in communication with said second interior cavity;

g) a second gas inlet port in communication with said second interior cavity; and h) a second chemical injection and withdrawal port in communication with said second interior cavity and covered with a second solid needle penetrable septum and oriented to accommodate the deposition and withdrawal of material from said reaction vessel.

9. The device of claim 8, wherein said gas inlet port and said second gas inlet port are in communication.

10. The device of claim 9, wherein said gas inlet port and said second gas inlet port are connected to a common source of inert gas.

11. The device of claim 10, wherein said chemical injection and withdrawal port and said second chemical injection and withdrawal port are covered with a single solid needle penetrable septum.

* * * * *